US008879501B2

(12) United States Patent
Nagasawa et al.

(10) Patent No.: US 8,879,501 B2
(45) Date of Patent: Nov. 4, 2014

(54) WIRELESS COMMUNICATION APPARATUS

(75) Inventors: Chizuko Nagasawa, Yokohama (JP);
Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 494 days.

(21) Appl. No.: 12/810,818

(22) PCT Filed: Dec. 26, 2008

(86) PCT No.: PCT/JP2008/073857
§ 371 (c)(1),
(2), (4) Date: Jun. 25, 2010

(87) PCT Pub. No.: WO2009/084687
PCT Pub. Date: Jul. 9, 2009

(65) Prior Publication Data
US 2010/0309883 A1    Dec. 9, 2010

(30) Foreign Application Priority Data

Dec. 27, 2007  (JP) ................................. 2007-337139

(51) Int. Cl.
*H04W 36/00* (2009.01)
*H04W 36/30* (2009.01)
*H04W 36/14* (2009.01)

(52) U.S. Cl.
CPC .............. *H04W 36/30* (2013.01); *H04W 36/14* (2013.01)
USPC ....................................................... 370/331

(58) Field of Classification Search
None
See application file for complete search history.

(56) References Cited

U.S. PATENT DOCUMENTS

2006/0077994 A1*  4/2006  Spindola et al. .............. 370/412

FOREIGN PATENT DOCUMENTS

| EP | 1694029 A1 | 8/2006 |
|----|------------|--------|
| JP | 2006-050488 | 2/2006 |
| JP | 2006-238445 | 9/2006 |
| JP | 2007-214985 | 8/2007 |
| JP | 2008-005392 | 1/2008 |
| KR | 20050023090 | 3/2005 |
| KR | 20070064673 | 6/2007 |
| WO | WO-2005/018157 A1 | 2/2005 |
| WO | WO-2006/044696 | 4/2006 |

OTHER PUBLICATIONS

English Translation of the Notice of Preliminary Rejection for KR 10-2010-7014190, mailed Sep. 27, 2011, 3 pages.

(Continued)

*Primary Examiner* — John Blanton
*Assistant Examiner* — Alan Lindenbaum
(74) *Attorney, Agent, or Firm* — Duane Morris LLP

(57) ABSTRACT

A wireless communication apparatus is provided with a wireless communication unit (31, 32, 34) for performing wireless communication by connecting to a first wireless communication network 15 and a second wireless communication network 16, an execution unit 33 of an application (application) for real-time communication, a jitter buffer 47 for absorbing jitter of packets of the application, a communication quality obtain unit 35 for obtaining communication quality of a wireless link in the first wireless communication network 15, a handover control unit 36 for starting handover from the first wireless communication network 15 to the second wireless communication network 16 based on the communication quality obtained, and a control unit 33 for controlling a reproduction speed of the application based on an accumulated packet amount in the jitter buffer 47 when a reception interval of packet received after completion of handover is equal to or over a predetermined value. Thereby, it is possible to perform handover to a different wireless communication network without deteriorating reproduced voice and a speech quality.

8 Claims, 10 Drawing Sheets

(56) References Cited

OTHER PUBLICATIONS

Office Action for Japanese Patent Application No. 337,139/2007, mailed May 8, 2012, 4 pages (including English translation).
International Search Report for PCT/JP2008/073857, mailed on Mar. 24, 2009, 2 pages.
JP 2007-337139 Office Action dated Oct. 16, 2012.
Liang et al., "Adaptive Playout Scheduling Using Time-Scale Modification in Packet Voice Communications," *Proceedings of IEEE International Conference on Acoustics, Speech, and Signal Processing* (*ICASSP*), May 7-11, 2001, Salt Lake City, UT, 3:1445-1448, XP010803129.
Extended European Search Report dated Feb. 21, 2014, from related European Patent Application No. 08867286.0, 9 pages.

* cited by examiner

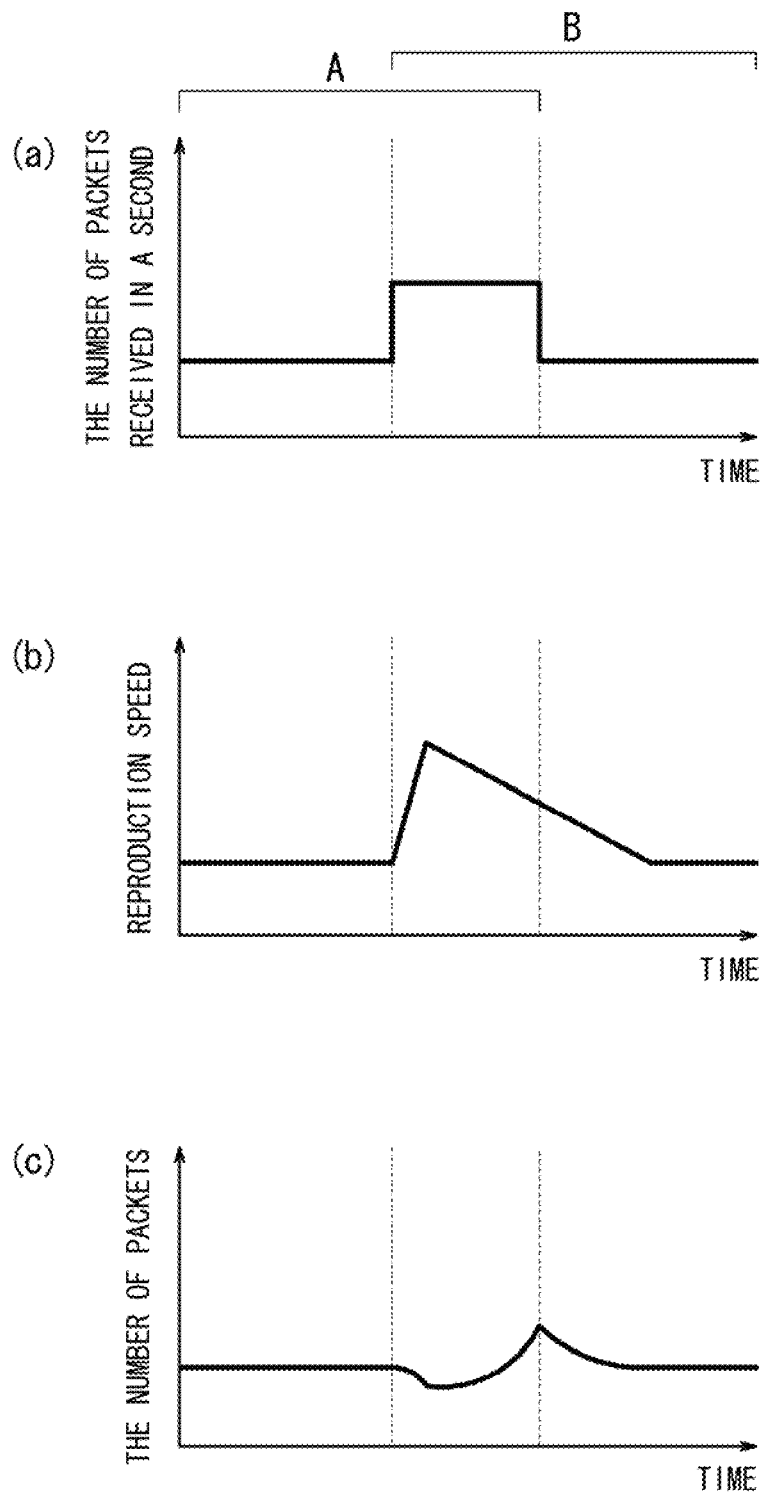

WIRELESS COMMUNICATION APPARATUS

CROSS REFERENCE TO RELATED APPLICATIONS

This application is a U.S. National Phase of International Application No. PCT/JP2008/073857 filed on Dec. 26, 2008, which claims priority to and the benefit of Japanese Patent Application No. 2007-337139 filed on Dec. 27, 2007, the entire contents of which are incorporated herein by reference.

TECHNICAL FIELD

The present invention relates to wireless communication apparatus capable of performing handover between different wireless communication networks.

BACKGROUND ART

In recent years, IETF (Internet Engineering Task Force) has been considering an IP mobility scheme for seamless movement capable of performing handover between a plurality of different wireless communication networks, such as a cellular phone network, a wireless LAN and the likes, so as to achieve a ubiquitous environment. As a specific protocol of the IP mobility scheme, there are Mobile IPv4 and Mobile IPv6 (which are abbreviated as Mobile IP, hereinafter) for supporting movement of an individual communication terminal, and NEMO (Network Mobility) for supporting mobility of a network as a unit.

Incidentally, when an application (hereinafter, abbreviated as APP appropriately) such as VoIP having a real-time property is executed via the wireless communication network, an allowable bandwidth of a wireless communication path changes depending on a propagation environment such as fading, and arrival intervals of packets received by the communication terminal are changed in accordance with a change of the allowable bandwidth.

For this reason, it is generally performed to provide the communication terminal with a jitter buffer so as to first store received packets in the jitter buffer and then read out the packets from the jitter buffer and reproduce the packets at intervals based on the application. Thereby, it absorbs deviation in the packets, that is, displacement of reproduction intervals of packets caused by displacement (jitter) of the arrival intervals of the packets, so as to prevent deterioration of reproduction quality such as reproduced sound quality and the likes. Moreover, when there is no packet in the jitter buffer since the jitter is large, and therefore silence occurs, or when too many packets are received in a short period to be stored in the jitter buffer, the communication terminal changes a reproduction speed, discards received packets, or changes a size of the jitter buffer (delay time).

On the other hand, a downlink absolute delay time of a packet received by the communication terminal, that is, a time required for a packet transmitted from a counterpart communication terminal to be received via the wireless communication network differs in accordance with wireless communication networks. Thus, when the communication terminal is a wireless communication apparatus which is moving and performs handover to a different wireless communication network, overtaking of received packets may occur when the downlink absolute delay time of a handover destination is shorter than that of a handover source, for example.

FIG. 8 is a diagram showing flows of the packets in such a case, showing transmission timings of the packets from the counterpart communication terminal (CN: Correspondent Node), transfer timings of the packets by a home agent (HA) to transfer the packets from the CN to the wireless communication apparatus (MN: Mobile Node), and reception timings of the packets by the jitter buffer of the MN. It is to be noted that it is assumed here that there is no deviation in the received packets (displacement of arrival intervals) at both of the wireless communication network A of the handover source and the wireless communication network B of the handover destination.

As a handover process by the MN from the wireless communication network A to the wireless communication network B, the MN transmits Registration Request (Binding Update for NEMO) to the HA via the wireless communication network B of the handover destination and registers a care-of address of the handover destination to the HA. Then, the MN receives Registration Reply (Binding Acknowledge for NEMO), which is handover completion information transmitted from the HA in response, cuts the connection with the wireless communication network A of the handover source, and then transmits/receives the packets via the wireless communication network B of the handover destination.

In this case, when the downlink absolute delay time TddnB of the wireless communication network B of the handover destination is shorter than the downlink absolute delay time TddnA of the wireless communication network A of the handover source by a predetermined value or more, it causes overtaking of the received packets for a period TAB (TddnA−TddnB) from a time of receiving the handover completion information. Hence, during this period TAB the number of packets received by the jitter buffer in a unit time becomes very high, as shown in FIG. 9(a).

In such a case, when the reproduction speed (read-out intervals) of the packets from the jitter buffer is a certain speed in accordance with the APP as shown in FIG. 9(b), the number of packets in the jitter buffer rapidly increases from completing handover to the wireless communication network B, as shown in FIG. 9(c). Thereby, the received packets exceeding a buffer size because of overtaking are discarded without being reproduced, and thus the number of packets in the jitter buffer settles down to a certain number of packets corresponding to the buffer size.

Discard of the packets as such causes deterioration of reproduced voice. When the buffer size of the jitter buffer is sufficiently large, the packets are not discarded but the packets from the handover source and the packets from the handover destination can be reproduced at scheduled timings. In such a case, however, the packets from the handover destination received overtaking the packets from the handover source stay in the jitter buffer longer than the packets from the handover source. As a result, delay times become excessively long, preventing achievement of a real-time property corresponding to the delay time of each of the wireless communication networks.

As a method capable of improving such a defect at handover, for example, there is suggested a control method of the jitter buffer to monitor reception conditions of packets and controls a speed to read out the packets from the jitter buffer based on a result of monitoring (for example, Patent Document 1).

FIG. 10 shows diagrams illustrating an operative condition of the jitter buffer by the control method of the jitter buffer disclosed in Patent Document 1. FIGS. 10(a) to (c), in the same manner as FIGS. 9(a) to (c), show the number of received packets by the jitter buffer in a unit time, the reproduction speed and the number of packets in the jitter buffer, respectively.

In FIG. 10, when the packets are received at shorter intervals than previous intervals such as a case where handover is performed from the wireless communication network A with the downlink absolute delay time TddnA to the wireless communication network B with the downlink absolute delay time TddnB shorter than the TddnA, the reproduction speed of the packets is set high in accordance with shortened reception intervals. Thereafter, the reproduction speed is controlled so as to gradually slow down to the normal reproduction speed in accordance with the number of packets in the jitter buffer.

Patent Document 1: Japanese Patent Laid-Open No. 2006-238445

SUMMARY OF INVENTION

Technical Problem

However, the control method of the jitter buffer shown in FIG. 10 changes the reproduction speed of the packets to a high speed during a period in which overtaking of packets occurs and, especially at beginnings of the period, increases the reproduction speed rapidly. Thereby, during the period it may cause that a packet from the handover destination is received and reproduced after a packet from the handover source has been received and reproduced and before a next packet is not completely received from the handover source, and the packets from the handover source arrived later are discarded. It is thus concerned that discard as such causes deterioration of reproduced voice.

In consideration of the above problem, it is an object of the present invention to provide a wireless communication apparatus capable of performing handover to a different wireless communication network with achieving the real-time property suitable for each wireless communication network without deteriorating reproduced sound due to packet loss.

Solution to Problem

In order to achieve the above object, a wireless communication apparatus according to a first aspect includes:
 a wireless communication unit for performing wireless communication by connecting to a first wireless communication network and a second wireless communication network different from the first wireless communication network;
 an execution unit for executing an application for real-time communication via the wireless communication unit;
 a jitter buffer for absorbing jitter by temporarily accumulating packets of the application being executed by the execution unit received via the wireless communication unit;
 a communication quality obtain unit for obtaining communication quality of a wireless link in the first wireless communication network;
 a handover control unit for starting handover from the first wireless communication network to the second wireless communication network based on the communication quality obtained by the communication quality obtain unit; and
 a control unit for controlling a reproduction speed of the application based on an accumulated packet amount in the jitter buffer, when a reception interval of packets of the application received via the wireless communication unit is equal to or over a predetermined value after completion of handover by the handover control unit.

A second aspect of the present invention is that, in the wireless communication apparatus according to the first aspect,
 the control unit increases the reproduction speed of the application when the accumulated packet amount in the jitter buffer is equal to or over a threshold.

A third aspect of the present invention is that, in the wireless communication apparatus according to the second aspect,
 the control unit returns the reproduction speed of the application to a normal speed when the accumulated packet amount in the jitter buffer is lower than the threshold during reproduction of the application at a high speed.

A fourth aspect of the present invention is that the wireless communication apparatus according to the first aspect further includes an adaptive jitter control unit for controlling a buffer size of the jitter buffer in accordance with a reception condition of the packets of the application, and
 the adaptive jitter control unit stops control of the buffer size of the jitter buffer if the adaptive jitter control unit detects completion of handover by the handover control unit.

Advantageous Effects on Invention

The wireless communication apparatus according to the present invention controls a reproduction speed of an application based on an accumulated packets amount in a jitter buffer when reception intervals of packets become equal to or over a predetermined value after completion of handover. Thereby, when a delay time of the second wireless communication network of a handover destination is shorter than a delay time of the first wireless communication network of a handover source, for example, it is possible to read out packets accumulated more than usual in the jitter buffer by increasing the reproduction speed than a normal speed after packet overtaking caused by handover is finished and packets are received only from the second wireless communication network of the handover destination. It is thus possible to perform handover from the first wireless communication network to the second wireless communication network without deteriorating reproduced sound because of packet loss and a speech quality because of lowering of the real-time property.

BRIEF DESCRIPTION OF DRAWINGS

FIG. 10 shows diagrams illustrating another example of the operative condition of the jitter buffer by the conventional wireless communication apparatus.

Figure 1:
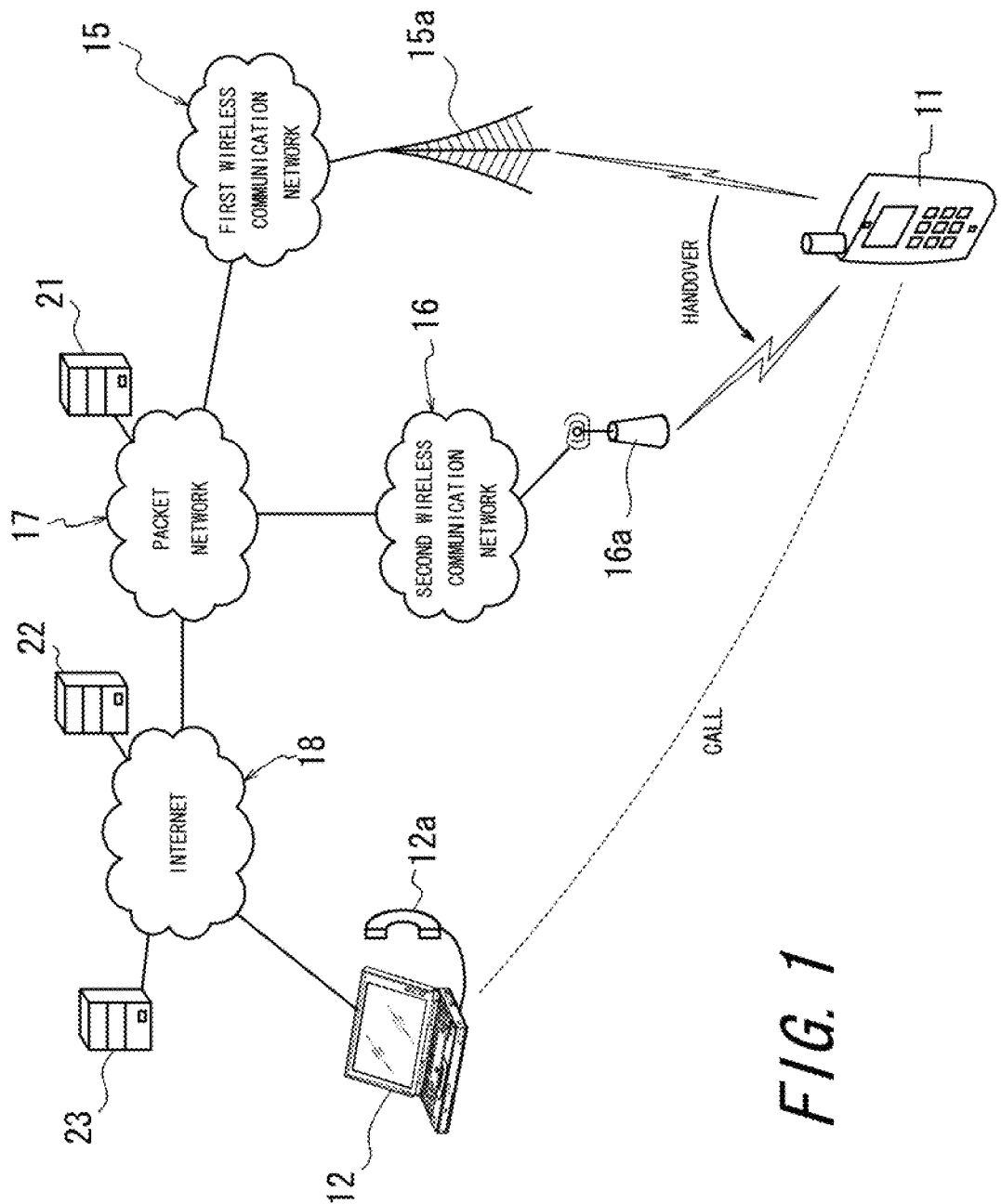
FIG. 1 shows a diagram illustrating a schematic constitution of a communication network which a wireless communication apparatus according to a first embodiment of the present invention can use.

REFERENCE SIGNS LIST 11 wireless communication apparatus
12 counterpart communication terminal
12a handset
15 first wireless communication network
15a base station
16 second wireless communication network
16a access point
17 packet network
18 internet
21, 22 SIP server
23 Home Agent (HA)
31 first wireless I/F
32 second wireless I/F
33 telephone function unit
34 communication processing unit
35 radio information obtain unit
36 handover control unit
47 jitter buffer
50 jitter buffer monitoring unit
51 jitter buffer control unit
55 handover information obtain unit
56 reproduction speed calculation unit

DESCRIPTION OF EMBODIMENT

An embodiment of the present invention will be described with reference to the accompanying drawings.

FIG. 1 is a diagram illustrating a schematic constitution of a communication network which a wireless communication apparatus according to an embodiment of the present invention can use. As shown in FIG. 1, a wireless communication apparatus 11, which is a mobile node, calls a counterpart communication terminal 12, which is a correspondent node, by using VoIP, an application for real-time communication. The wireless communication apparatus 11 can perform handover between a first wireless communication network 15 and a second wireless communication network 16. The first wireless communication network 15 and the second wireless communication network 16 are connected to the internet 18 via a packet network 17.

The first wireless communication network 15 may be constituted of a cellular phone network such as cdma 2000 EV-DO, for example, whereas the second wireless communication network 16 may be constituted of a wireless LAN, for example. A downlink absolute delay time of the second wireless communication network 16 is shorter than that of the first wireless communication network 15. In FIG. 1, a reference sign 15a and a reference sign 16a show a base station of the first wireless communication network 15 and an access point of the second wireless communication network 16, respectively.

The counterpart communication terminal 12 may be a personal computer, for example, having a handset 12a connected thereto and a softphone installed therein, and is connected to the internet 18 via an internet service provider (not shown).

The packet network 17 and the internet 18 are connected to SIP (Session Initiation Protocol) servers 21 and 22 for controlling communication, respectively. Moreover, the internet 18 is connected to a Home Agent (HA) 23 for transferring received packets addressed to the wireless communication apparatus 11 to a wireless communication network to which the wireless communication apparatus 11 is connected.

In the communication network shown in FIG. 1, a home address used in the wireless communication network to which the wireless communication apparatus 11 originally belongs is registered to the HA 23, and a care-of address of the wireless communication network 16 of a handover destination is also registered when performing handover. Thereby, the wireless communication apparatus 11 can perform handover between different wireless communication networks. Since such IP mobility techniques are known in systems of above Mobile IP and NEMO, detailed description thereof is omitted here.

In the present embodiment, for the sake of convenience in description, it is assumed that the wireless communication network to which the wireless communication apparatus 11 originally belongs is the first wireless communication network 15 and handover is performed from the first wireless communication network 15 to the second wireless communication network 16.

Figure 2:
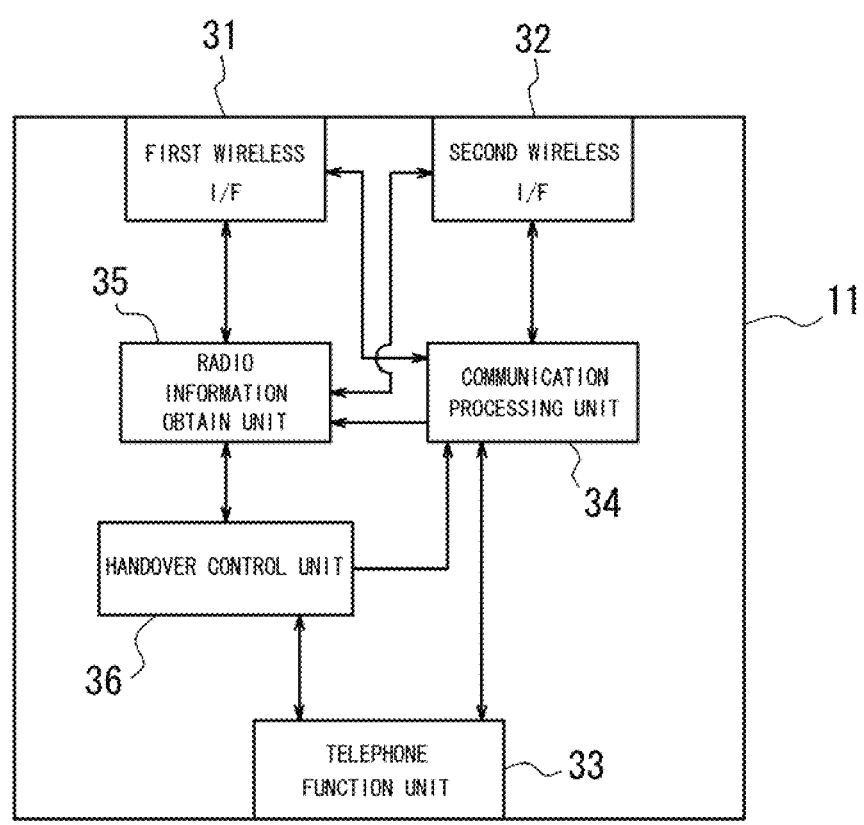
FIG. 2 shows a block diagram illustrating a schematic constitution of the wireless communication apparatus shown in FIG. 1.

FIG. 2 is a functional block diagram illustrating a schematic constitution of the wireless communication apparatus according to the present embodiment shown in FIG. 1. The wireless communication apparatus 11 is provided with a first wireless I/F (interface) 31 corresponding to the first wireless communication network 15, a second wireless I/F 32 corresponding to the second wireless communication network 16, a telephone function unit 33 for executing an application of VoIP, a communication processing unit 34 for controlling connection to the first wireless communication network 15 and the second wireless communication network 16, a radio information obtain unit 35 for obtaining radio information of the first wireless communication network 15 and the second wireless communication network 16, and a handover control unit 36 for controlling handover between the first wireless communication network 15 and the second wireless communication network 16.

The communication processing unit 34, together with the first wireless I/F 31 and the second wireless I/F 32, constitutes a wireless communication unit for executing wireless communication. The communication processing unit 34 controls connection of the first wireless I/F 31 or the second wireless I/F 32 such that the telephone function unit 33 and the counterpart communication terminal 12 communicate each other via the first wireless communication network 15 or the second wireless communication network 16, and communicate with the HA 23 under a control of the handover control unit 36.

The radio information obtain unit 35 obtains communication quality of the first wireless communication network 15 and the second wireless communication network 16 as radio information from the first wireless I/F 31 and the second wireless I/F 32, correspondingly, and provides the communication quality obtained to the handover control unit 36. Here, RSSI (Received Signal Strength Indicator) indicating a radio condition is obtained as the communication quality. The radio information obtain unit 35 thus constitutes a communication quality obtain unit for obtaining the communication quality of a wireless link.

The handover control unit 36 generates handover information which includes a determination whether to schedule handover, based on the communication quality from the radio information obtain unit 35, and controls handover from the first wireless communication network 15 to the second wireless communication network 16 based on the handover information.

Figure 3:
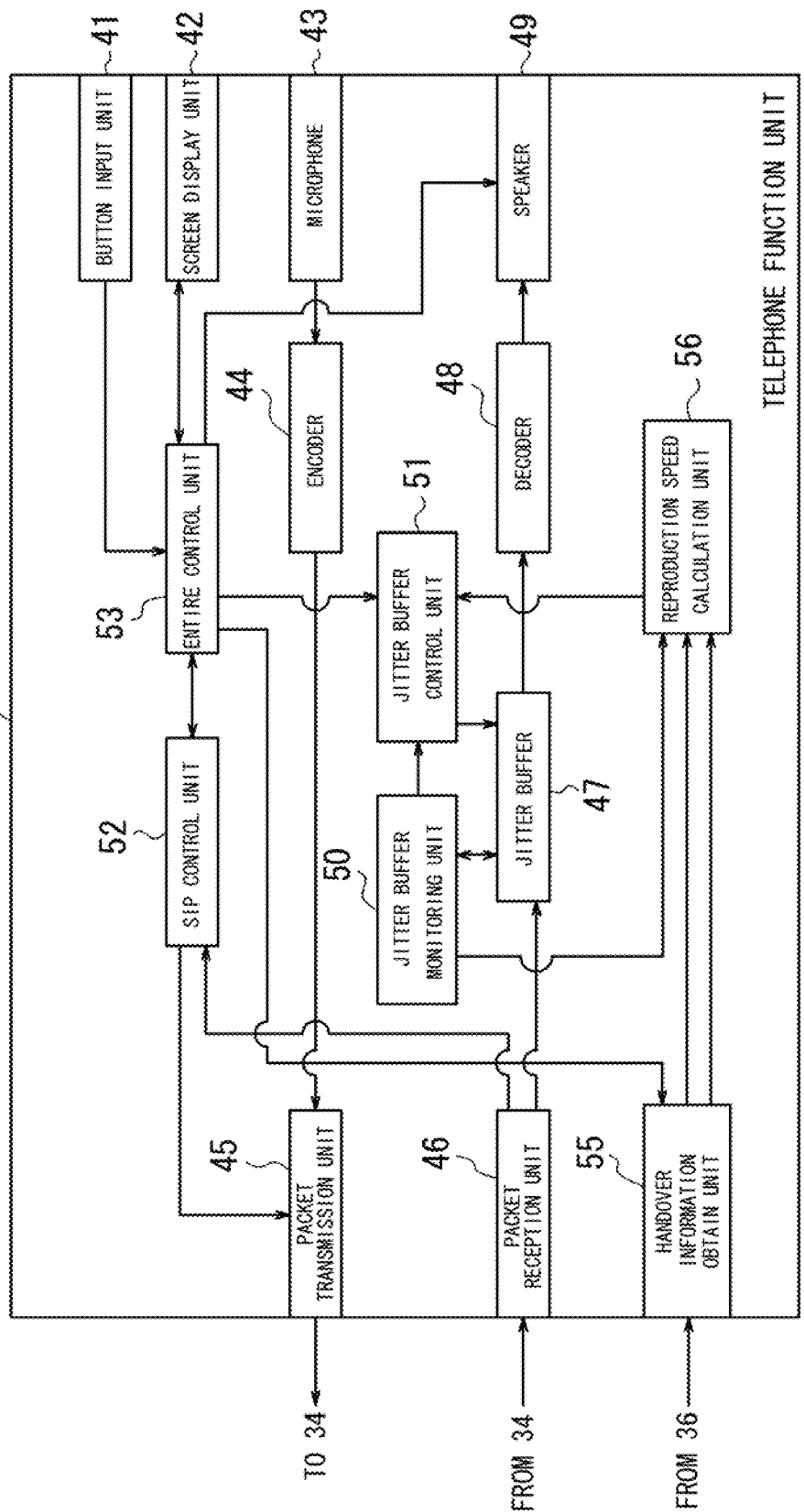
FIG. 3 shows a functional block diagram illustrating a schematic constitution of a telephone function unit of the wireless communication apparatus shown in FIG. 2.

FIG. 3 is a functional block diagram illustrating a schematic constitution of the telephone function unit 33 of the wireless communication apparatus 11 shown in FIG. 2. The telephone function unit 33 may be a softphone, for example, and similarly to a constitution of a known softphone, is provided with a button input unit 41, a screen display unit 42, a microphone 43, an encoder 44, a packet transmission unit 45, a packet reception unit 46, a jitter buffer 47, a decoder 48, a speaker 49, a jitter buffer monitoring unit 50, a jitter buffer control unit 51, an SIP control unit 52, and an entire control unit 53 for controlling operations entirely.

The entire control unit 53 obtains operation information by a user via the button input unit 41 or the screen display unit 42 and controls entire operations based on the information obtained. The SIP control unit 52 controls SIP procedure to start or end the call. During the call, audio data obtained from the microphone 43 are encoded by the encoder 44 and the encoded data are inserted in packets by the packet transmission unit 45 and transmitted to the counterpart communication terminal 12 via the communication processing unit 34.

Packets from the counterpart communication terminal 12 received by the packet reception unit 46 via the communication processing unit 34 are once stored in the jitter buffer 47 and then read out. Then, payloads of the packets read out are decoded by the decoder 48 and output as reproduced voice from the speaker 49. A reception condition of the packets of the jitter buffer 47 and the number of packets in the jitter buffer 47 are monitored by the jitter buffer monitoring unit 50, and the jitter buffer control unit 51 controls an operation of the jitter buffer 47 based on a result of monitoring.

In the wireless communication apparatus 11 according to the present embodiment, the telephone function unit 33 is further provided with a handover information obtain unit 55 and a reproduction speed calculation unit 56. The handover information obtain unit 55 monitors the handover information from the handover control unit 36 at predetermined intervals to obtain information on whether there is a handover schedule. When there is the handover schedule, the handover information obtain unit 55 further obtains required handover information from the handover control unit 36 and provides the reproduction speed calculation unit 56 with the required handover information obtained.

The reproduction speed calculation unit 56 calculates a difference between the downlink absolute delay time of the second wireless communication network 16 of the handover destination and the downlink absolute delay time of the first wireless communication network 15 of the handover source, based on the required handover information obtained from the handover information obtain unit 55. When the difference is less than a predetermined value (<0, for example) as a result, the jitter buffer control unit 51 controls the buffer size of the jitter buffer 47 and the reproduction speed of the received packets from the jitter buffer 47 after receiving handover completion information, based on the monitoring result of the jitter buffer 47 by the jitter buffer monitoring unit 50. Thus, the telephone function unit 33 constitutes an execution unit for executing an application for real-time communication and a control unit for controlling a reproduction speed of the application.

The following is a description of an operation of the wireless communication apparatus 11 according to the present embodiment.

The handover control unit 36 determines the handover schedule based on the communication quality obtained from the first wireless I/F 31 and the second wireless I/F 32. For example, when the communication quality obtained from the first wireless I/F 31 becomes lower than a handover schedule determination threshold and the communication quality obtained from the second wireless I/F 32 becomes equal to or over the handover schedule determination threshold during the call forming the wireless link with the first wireless communication network 15, the handover control unit 36 determines to schedule handover to the second wireless communication network 16, that is, determines to start preparation for handover. The communication quality of the second wireless communication network 16 not being used for the call is obtained (measured) by receiving notification information transmitted from the access point 16a, for example.

When determining the handover schedule, the handover control unit 36 obtains a downlink absolute delay time Tddn1 of the handover source in the wireless communication network being used currently (the first wireless communication network 15, in this case) and a downlink absolute delay time Tddn2 of the handover destination in a wireless communication network to which handover will be performed (the second wireless communication network 16, in this case). Information on them, together with information indicating that there is a handover schedule, is provided as the required handover information to the telephone function unit 33.

Next, methods for obtaining the downlink absolute delay time Tddn1 of the handover source and the downlink absolute delay time Tddn2 of the handover destination by the handover control unit 36 are described. It is to be noted that in the following description, since the network between the counterpart communication terminal (CN) 12 and the HA 23 is not changed, the absolute delay time therebetween is not considered.

The downlink absolute delay time Tddn1 of the handover source and the downlink absolute delay time Tddn2 of the handover destination are obtained by using one of the first to fourth methods for obtaining absolute delay time described below, for example.

(a) First Method for Obtaining the Absolute Delay Time

After determining the handover schedule, the handover control unit 36 controls the telephone function unit 33 and/or the communication processing unit 34 to require the HA 23, which is synchronized with the wireless communication apparatus 11, to transmit measuring packets having transmission time stamps. Thereby, the HA 23 transmits the measuring packets to both of the first wireless communication network 15 and the second wireless communication network 16. The wireless communication apparatus 11 receives the measuring packets transmitted from the HA 23 via the first wireless I/F 31 and the second wireless I/F 32, correspondingly, and measures the downlink absolute delay times Tddn1 and Tddn2 of corresponding networks based on reception times of the measuring packets and the time stamps of the measuring packets. When the downlink absolute delay time of the wireless communication network of the handover source can be measured from the packets received during the call, it is possible to omit transmission of the measuring packets to the wireless communication network of the handover source.

(b) Second Method for Obtaining the Absolute Delay Time

After determining the handover schedule, the handover control unit 36 controls the telephone function unit 33 and/or the communication processing unit 34 to inform the HA 23, which is synchronized with the wireless communication apparatus 11, accordingly. Thereby, in the same manner as the first method for obtaining the absolute delay time described above, the HA 23 transmits the measuring packets to both of the first wireless communication network 15 and the second wireless communication network 16, so that the handover control unit 36 measures the downlink absolute delay times Tddn1 and Tddn2 of corresponding networks.

(c) Third Method for Obtaining the Absolute Delay Time

After determining the handover schedule, the handover control unit 36 controls the telephone function unit 33 and/or the communication processing unit 34 such that the wireless communication apparatus 11 transmits measuring packets such as PING, RTCP and the likes to the HA 23, which is synchronized with the wireless communication apparatus 11, through both of the first wireless communication network 15 and the second wireless communication network 16, receives responses and measures the downlink absolute delay times Tddn1 and Tddn2 of the corresponding networks.

(d) Fourth Method for Obtaining the Absolute Delay Time

After determining the handover schedule, the handover control unit 36 obtains the absolute delay time of each of the wireless communication networks by using a handover scheme which has been considered by IEEE 802.21. The following is an exemplified method for obtaining the absolute delay time.

First, the method for obtaining the absolute delay time (Tddn1) of the first wireless communication network 15 is described below.

The wireless communication apparatus 11 obtains the following values held in a first information server of the first wireless communication network 15.

A reference value (Tn3) of a one-way delay time from a measuring server (connecting to a backbone network of the internet 18, for example) which operates to measure the delay time to the base station 15a currently connected on the first wireless communication network 15

Reference values of downlink and uplink absolute delay times between the base station 15a and a terminal connecting thereto (downlink: Trdn3, uplink: Trup3)

Furthermore, the wireless communication apparatus 11 transmits the measuring packets such as PING and the likes to the HA 23 and, by receiving a response, measures a round-trip delay time Trt1 between the wireless communication apparatus 11 and the HA 23.

Then, the absolute delay time Tddn1 of the first wireless communication network 15 is calculated from the above values by using a formula (1) shown below. However, since the one-way delay time between the base station 15a and the HA 23 cannot be obtained, this one-way delay time is defined as an approximate value of a sum of the Tn3 and {Trt1−(Tn3+Trdn3+Tn3+Trup3)}/2.

[Formula 1]

$$Tddn1 = Tn3 + Trdn3 + \{Trt1 - (Tn3 + Trdn3 + Tn3 + Trup3)\}/2 \quad (1)$$

Next, a method for obtaining the absolute delay time (Tddn2) of the second wireless communication network 16 of the handover destination is described below.

The wireless communication apparatus 11 obtains the following values stored in a second information server connected to the second wireless communication network 16 of the handover destination via the first information server of the first wireless communication network 15. Location information of the wireless communication apparatus 11, obtained by the wireless communication apparatus 11 or the base station 15a, is transmitted to the second information server.

A reference value (Tn4) of a one-way delay time between the access point 16a, to which the wireless communication apparatus 11 is expected to connect, and the measuring server Reference values of downlink and uplink absolute delay times between the access point 16a and a terminal connecting thereto (downlink: Trdn4, uplink: Trup4)

Then, the absolute delay time Tddn2 of the second wireless communication network 16 is calculated from the above values by using a formula (2) shown below. However, since a one-way delay time between the access point 16a and the HA 23 cannot be obtained, this one-way delay time is defined as an approximate value of a sum of the Tn4 and {Trt1−(Tn3+Trdn3+Tn3+Trup3)}/2.

[Formula 2]

$$Tddn2 = Tn4 + Trdn4 + \{Trt1 - (Tn3 + Trdn3 + Tn3 + Trup3)\}/2 \quad (2)$$

Thus, the handover control unit 36 obtains the downlink absolute delay time Tddn1 of the handover source and the downlink absolute delay time Tddn2 of the handover destination and provides such information obtained to the telephone function unit 33.

Moreover, when the handover control unit 36 determines the handover schedule, the handover control unit 36 controls the wireless processing unit 34 to connect the second wireless I/F 32 to the second wireless communication network 16. Then, the handover control unit 36 transmits Registration Request (Binding Update for NEMO) to the HA 23 via the second wireless communication network 16 of the handover destination and registers a care-of address of the handover destination to the HA 23. At that time, the handover control unit 36 sets 8 bits of Registration Request Field of Registration Request message (uses Multiple care-of address for NEMO), so as to be able to communicate with either the first wireless communication network 15 or the second wireless communication network 16. When the second wireless I/F 32 thereby receives Registration Reply (Binding Acknowledge for NEMO), which is the handover completion information, transmitted from the HA 23 in reply, the handover control unit 36 deregisters the care-of address of the first wireless communication network 15 of the handover source and disconnects. Thereafter, the handover control unit 36 controls the communication processing unit 34 so as to execute continuously the VoIP application via the second wireless communication network 16 of the handover destination, as well as providing the handover completion information received to the telephone function unit 33.

Figure 4:
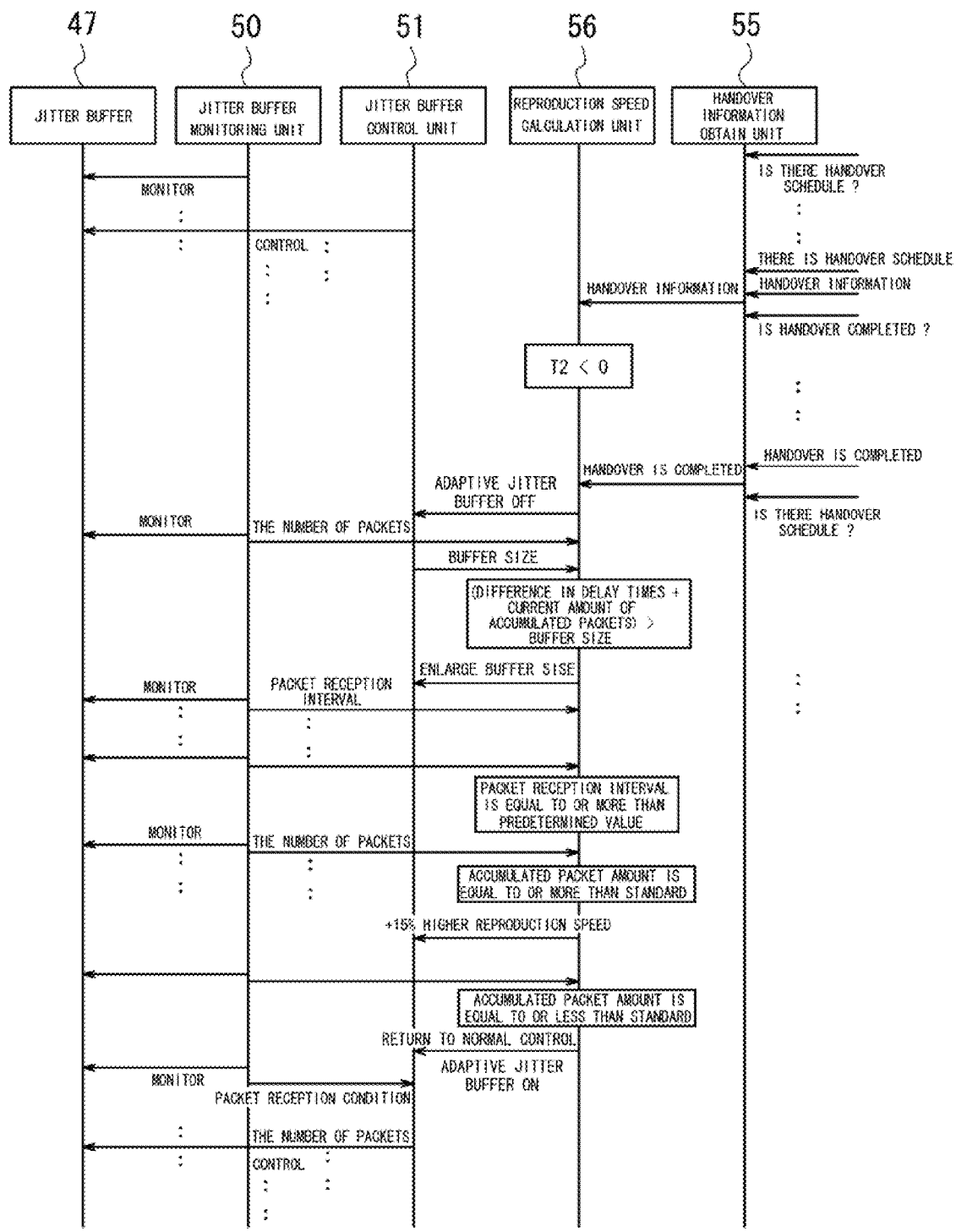
FIG. 4 shows a sequence diagram illustrating an operation of a main part of the telephone function unit shown in FIG. 3.
Figure 5:
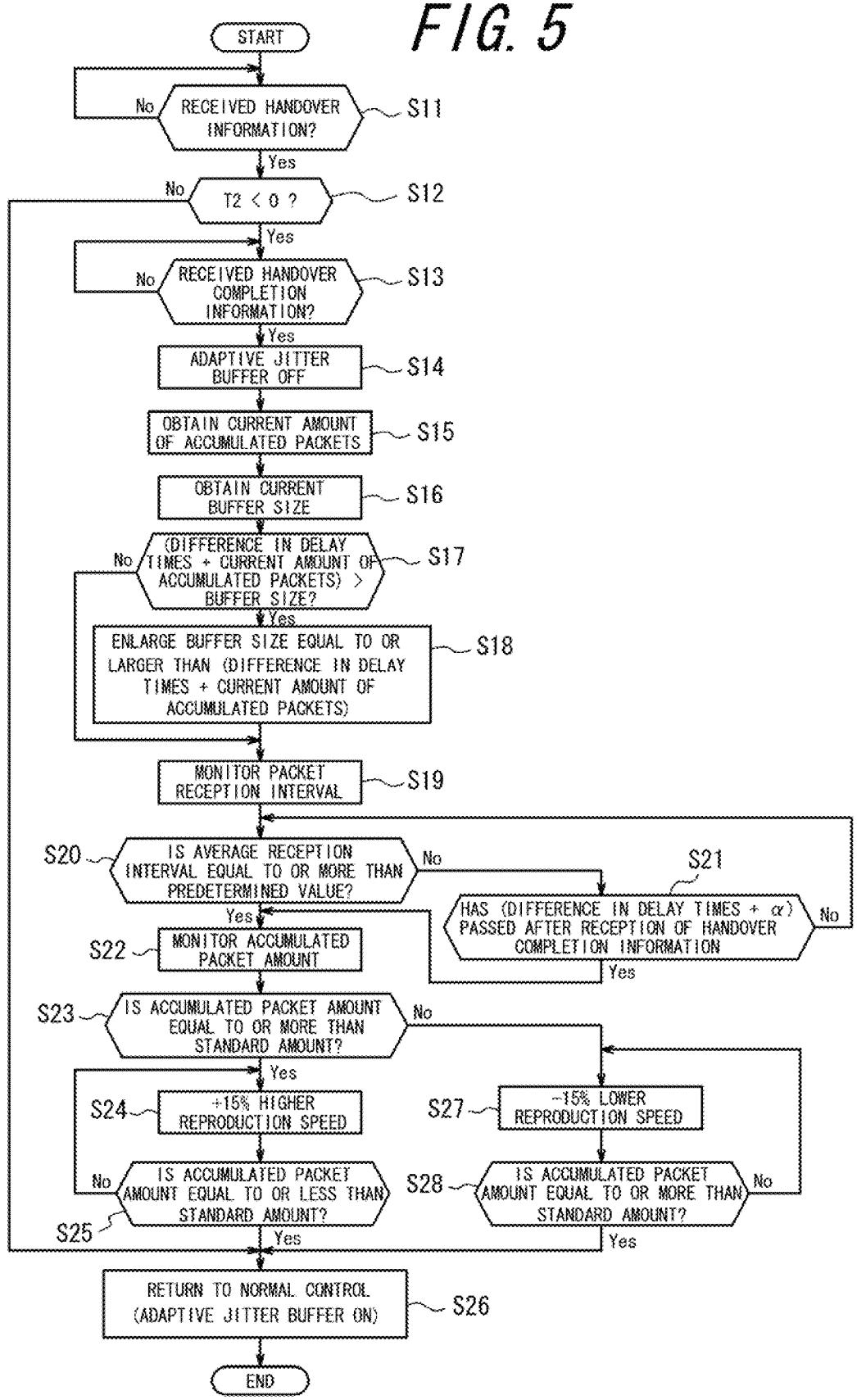
FIG. 5 shows a flow chart showing the operation of the main part of the telephone function unit shown in FIG. 3.

FIG. 4 is a sequence diagram illustrating an operation of a main part of the telephone function unit 33. In addition, FIG. 5 is a flow chart also showing the operation of the main part of the telephone function unit 33. Here, the operation is described with reference to the flow chart in FIG. 5.

The handover information obtain unit 55 monitors handover information from the handover control unit 36 at predetermined intervals. When receiving information indicating that there is a handover schedule as a result, the handover information obtain unit 55 further obtains the downlink absolute delay time Tddn1 of the handover source and the downlink absolute delay time Tddn2 of the handover destination (step S11), which are the required handover information from the handover control unit 36, and provides that required handover information obtained to the reproduction speed calculation unit 56.

The reproduction speed calculation unit 56 calculates a difference T2 (T2=Tddn2−Tddn1) between the downlink absolute delay time (Tddn1) of the first wireless communication network 15 and the downlink absolute delay time (Tddn2) of the second wireless communication network 16 obtained from the handover information obtain unit 55 and determines whether the difference T2 is less than a predetermined value (<0, for example) (step S12). When the difference T2 is less than the predetermined value as a result, the reproduction speed calculation unit 56 waits for Registration Reply (Binding Acknowledge for NEMO), which is the handover completion information transmitted from the handover control unit 36 via the handover information obtain unit 55 (step S13).

Subsequently, when receiving the handover completion information at step S13, the reproduction speed calculation unit 56 sets the buffer size of the jitter buffer 47 appropriately. Hence, at first when the jitter buffer 47 has an adaptive jitter buffer function to control the buffer size by the jitter buffer control unit 51 in accordance with the reception condition of the packets by the jitter buffer monitoring unit 50, the reproduction speed calculation unit 56 instructs the jitter buffer control unit 51 to turn off (inactivate) the adaptive jitter buffer function (step S14). Thereby, it prevents discard of the packets from the handover source caused by overtaking of the packets from the handover destination. In this case, the jitter buffer control unit 51 thus functions as an adaptive jitter control unit. When the jitter buffer 47 does not have the adaptive jitter buffer function to dynamically control the buffer size, the process at step S14 is omitted.

Next, the reproduction speed calculation unit 56 obtains a current amount of accumulated packets in the jitter buffer 47 from the jitter buffer monitoring unit 50 (step S15). The current amount of the accumulated packets is shown as a required time to reproduce all the packets currently accumulated in the jitter buffer 47 at the reproduction speed at a time of receiving the handover completion information. The reproduction speed calculation unit 56 further obtains a current buffer size of the jitter buffer 47 from the jitter buffer control unit 51 (step S16).

Then, the reproduction speed calculation unit 56 determines whether a sum of the difference in the delay times between the handover source and the handover destination (an absolute value of the difference T2 calculated at step S12) and the current amount of the accumulated packets obtained at step S15 exceeds the buffer size obtained at step S16 (step S17).

When the buffer size is less than a value (the difference in the delay times+the current amount of the accumulated packets) as a result, the reproduction speed calculation unit 56 controls the buffer size of the jitter buffer 47 to be increased equal to or over the value (the difference in the delay times+ the current amount of the accumulated packets), via the jitter buffer control unit 51 (step S18). It thereby prevents occurrence of overrun of the packets caused by handover, that is, discard of arrived packets as they are too many to be stored in the jitter buffer 47.

Then, the reproduction speed calculation unit 56 periodically obtains the intervals of packet reception by the jitter buffer 47 from the jitter buffer monitoring unit 50 (step S19) and determines whether an average of the intervals of the packet reception is equal to or over a predetermined value corresponding to the application being executed (higher than 20 msec for VoIP, for example) (step S20). It is to be noted that, since it does not cause overrun when the condition (the difference in the delay times+the current amount of the accumulated packets)<(buffer size) is satisfied at step S17, the operation shifts to step S19, leaving the buffer size as it stands at the time of handover.

When the packet reception interval is less than the predetermined value as a result of determination at step S20, overtaking of the packets can occur because of handover. Therefore, in this case the reproduction speed calculation unit 56 determines whether a period, a sum of the difference in the delay times of the handover source and the handover destination and a certain time a (a time to receive a few packets, for example), has passed since the handover completion information was received (step S21). When the period has not passed, the operation returns to step S20.

In contrast, when the packet reception interval is equal to or longer than the predetermined value as a result of determination at step S20 or where the period (difference in delay times+α) has already passed since completion of handover as a result of determination at step S21, overtaking of packets is not caused by handover. Therefore, the reproduction speed calculation unit 56 periodically obtains the amount of the accumulated packets in the jitter buffer 47 from the jitter buffer monitoring unit 50 (step S22) and determines whether the amount of the accumulated packets is equal to or over a standard amount (step S23). It is to be noted that the standard amount of the accumulated packets is determined in advance, based on the transmission intervals of the packets by the application being executed and downlink jitter of the handover destination, and stored in the reproduction speed calculation unit 56.

When the amount of the accumulated packets is equal to or over the standard amount as a result of the determination at step S23, the reproduction speed calculation unit 56 changes the reproduction speed of the application from the normal reproduction speed in accordance with the application currently adopted to a high speed which will not deteriorate a speech quality (speed 15% faster than the normal speed, for example) (at step S24). Thereafter, when the amount of the accumulated packets in the jitter buffer 47 becomes equal to or less than the standard amount (step S25), the reproduction speed calculation unit 56 returns to a normal control to return the reproduction speed of the application to the normal speed (step S26). Thus, when the adaptive jitter buffer function is turned off at step S14, the reproduction speed calculation unit 56 instructs the jitter buffer control unit 51 to turn on (activate) the adaptive jitter buffer function, at step S26.

In contrast, when the amount of the accumulated packets is less than the standard amount as a result of determination at step S23, the reproduction speed calculation unit 56 changes the reproduction speed of the application from the normal reproduction speed in accordance with the application currently adopted to a low speed which will not deteriorate a speech quality (speed 15% slower than the normal speed, for example) (at step S27). Thereafter, when the amount of the accumulated packets in the jitter buffer 47 becomes equal to or over the standard amount (step S28), the operation shifts to step S26.

It is to be noted that, when the difference T2 (T2=Tddn2−Tddn1) between the downlink absolute delay time (Tddn1) of the first wireless communication network 15 and the downlink absolute delay time (Tddn2) of the second wireless communication network 16 is equal to or over the predetermined value at step S12, it is regarded as handover to another wireless communication network with the downlink absolute delay time greater than that of the first wireless communication network 15 and the operation returns to step S26 to perform the normal control.

Figure 6:
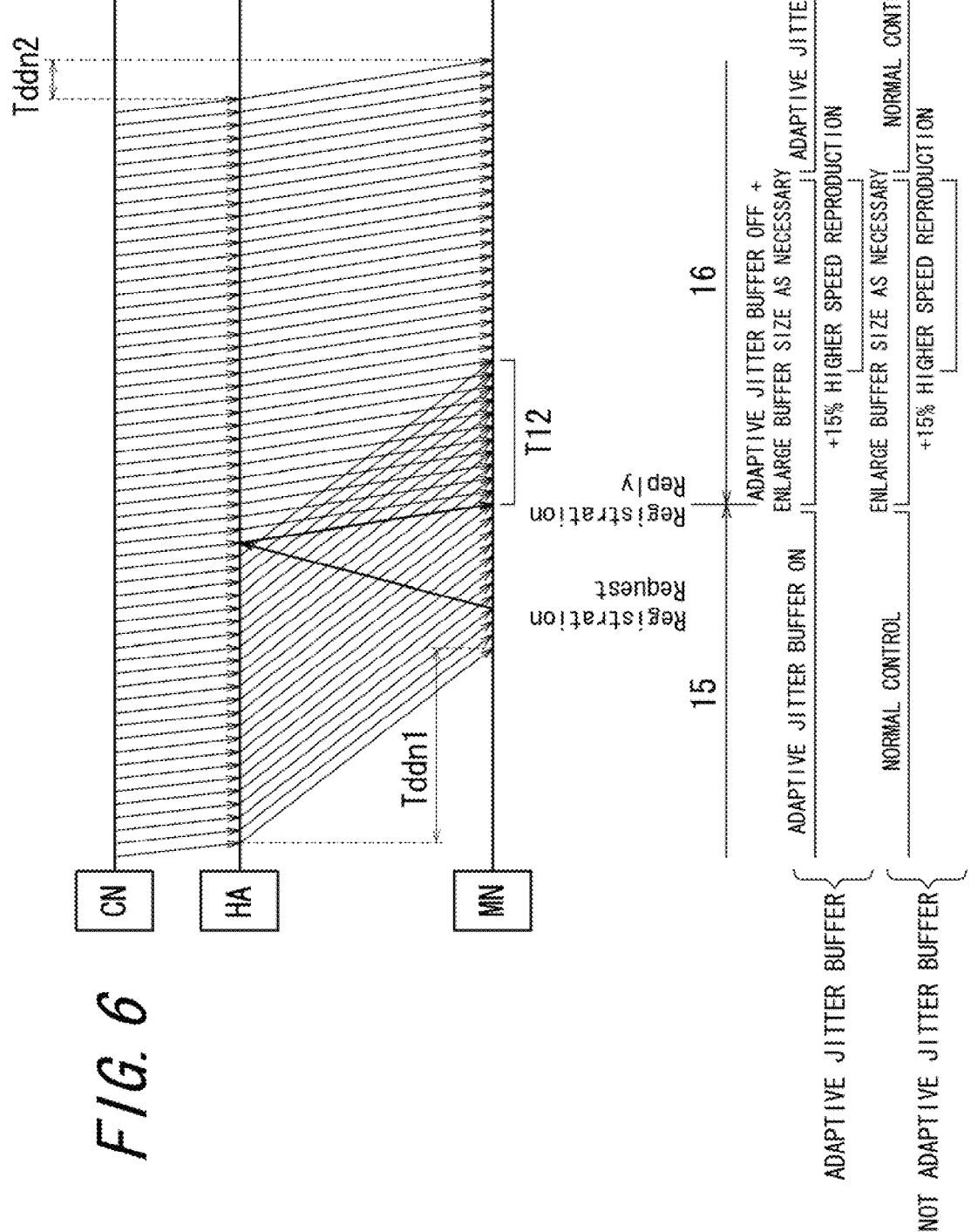
FIG. 6 shows an explanatory diagram of flows of packets at handover by the wireless communication apparatus according to the present embodiment and an operation of a jitter buffer in relation to each other.

FIG. 6 is an explanatory diagram showing flows of the packets at handover by the wireless communication apparatus 11 according to the present embodiment and the operation of the jitter buffer 47 in relation to each other. In FIG. 6, the CN, the HA and the MN correspond to the counterpart communication terminal 12, the home agent 23, and the wireless communication apparatus 11 according to the present embodiment, respectively. It is to be noted that it is assumed in FIG.

6 that there is no jitter of the received packets in each of the first wireless communication network 15 of the handover source and the second wireless communication network 16 of the handover destination.

Figure 7:
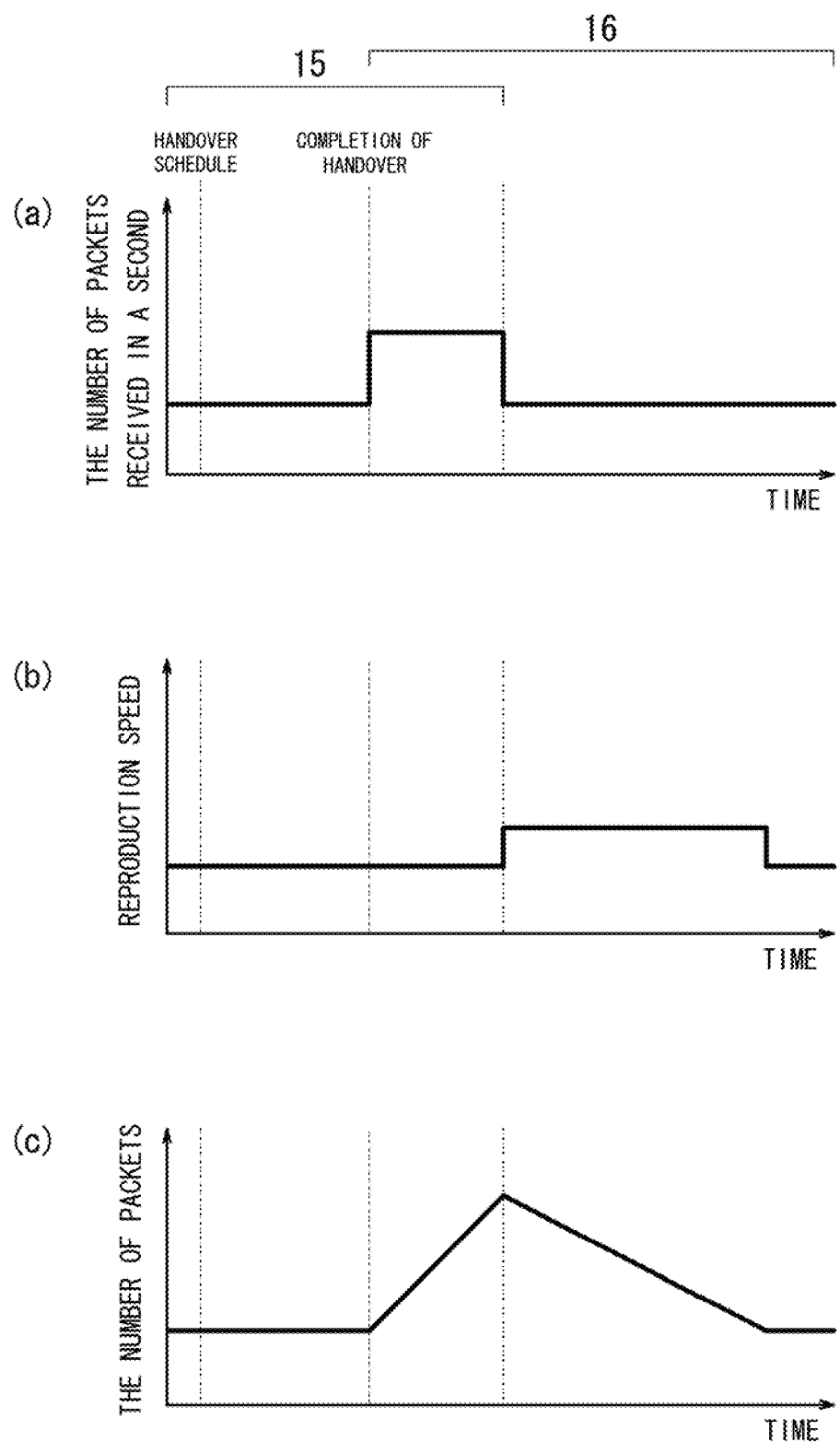
FIG. 7 shows diagrams illustrating an operative condition of the jitter buffer by the wireless communication apparatus according to the present embodiment.

FIG. 7 shows diagrams illustrating the operative condition of the jitter buffer 47 of the wireless communication apparatus 11 according to the present embodiment. FIGS. 7(*a*) to (*c*) show the number of packets received in a unit time, the reproduction speed and the number of packets (the amount of the accumulated packets) in the jitter buffer 47, respectively.

Figure 8:
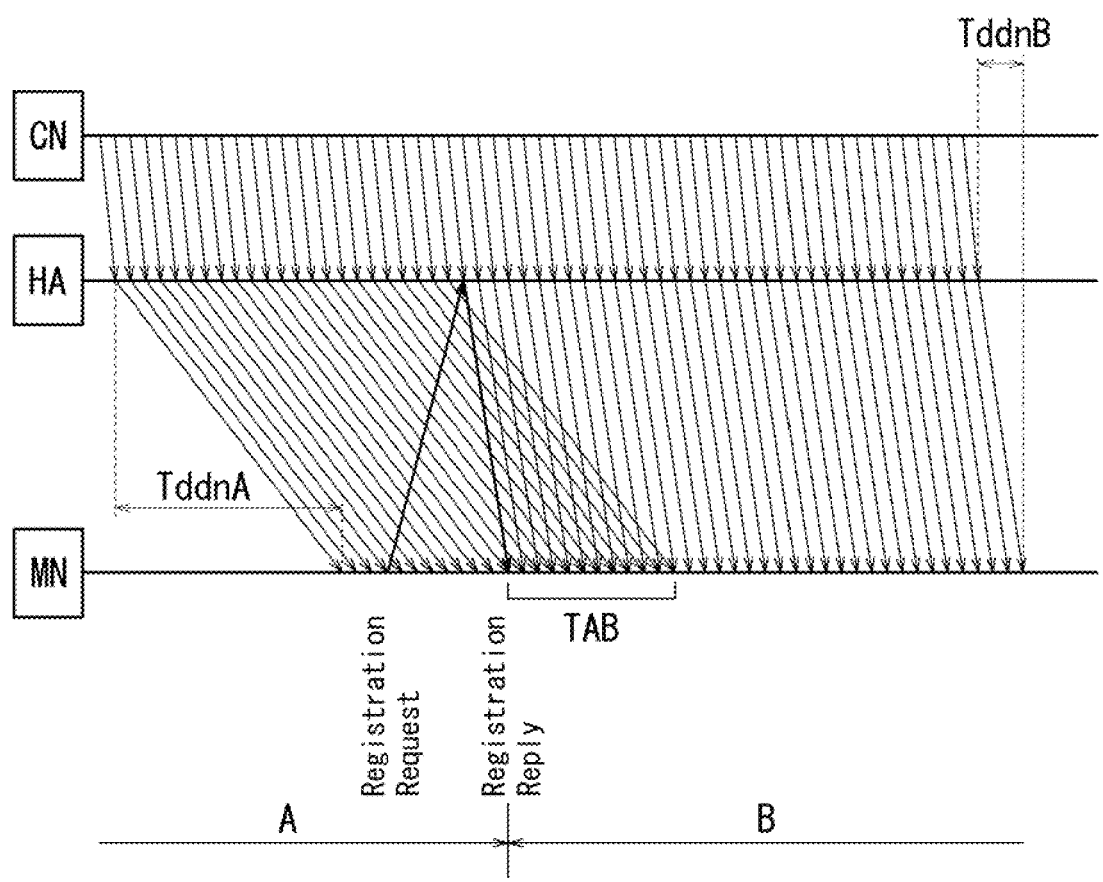
FIG. 8 shows a diagram illustrating the flows of the packets at handover by a conventional wireless communication apparatus.
Figure 9:
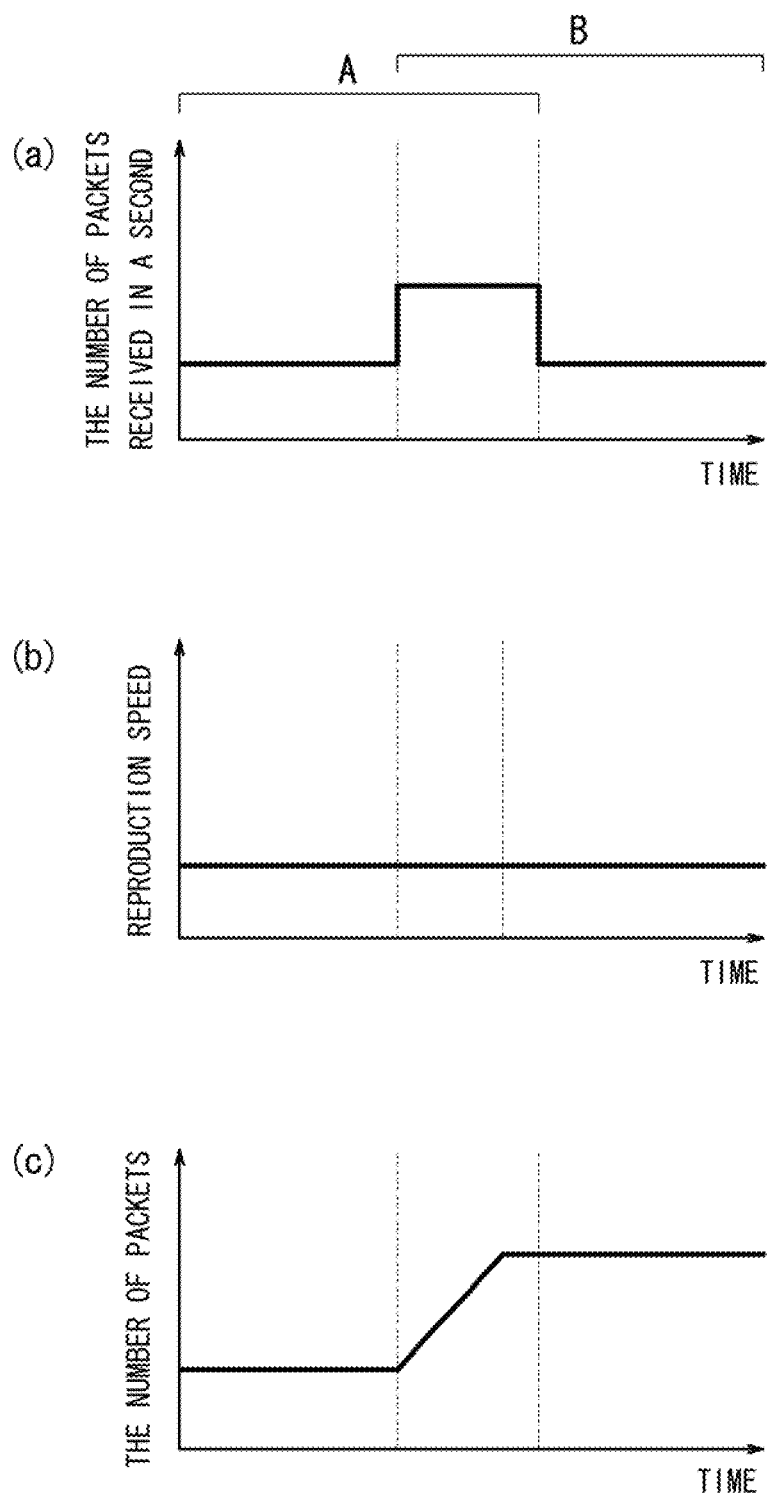
FIG. 9 shows diagrams illustrating one example of the operative condition of the jitter buffer by the conventional wireless communication apparatus.

As shown in FIG. 6, when the downlink absolute delay time Tddn2 of the second wireless communication network 16 of the handover destination is shorter than the downlink absolute delay time Tddn1 of the first wireless communication network 15 of the handover source by a predetermined value or more, it causes overtaking of received packets for the period of T12 (Tddn1−Tddn2) from the time of receiving Registration Reply (Binding Acknowledge for NEMO), which is the handover completion information, in the same manner as above description of FIG. 8. Thereby, the number of packets received by the jitter buffer in the unit time becomes very large during the period T12 as shown in FIG. 7(*a*) and, in accordance with that, the number of packets in the jitter buffer 47 increases as shown in FIG. 7(*c*).

Therefore, in such a case of handover, when the wireless communication apparatus 11 according to the present embodiment receives the handover completion information from the HA 23 and the jitter buffer 47 has the adaptive jitter buffer function, the adaptive jitter buffer function is tuned off and the buffer size is increased as necessary. Thereby, it is possible to prevent discard of the arriving packets because of being too many to be stored in the jitter buffer 47 and reproduce the application at the normal reproduction speed by reading out the packets in the jitter buffer 47 in order of the time stamp at the normal speed.

Then, when the average of the packet reception intervals becomes equal to or over the predetermined value corresponding to the application being executed, it is considered that overtaking of the packets is not caused any more by handover, and the reproduction speed of the jitter buffer 47 (reproduction speed of the application) is set to the speed+15% faster than the normal speed as shown in FIG. 7(*b*) and the packets are reproduced in order of the time stamp at a high speed. Thereby, the number of packets in the jitter buffer 47 decreases as shown in FIG. 7(*c*). Later, when the amount of the accumulated packets in the jitter buffer 47 becomes equal to or less than the standard amount, it is returned to the normal control and, in a case where the adaptive jitter buffer function has been turned off, the adaptive jitter buffer function is turned on and the application is reproduced at the normal speed.

Thus, according the wireless communication apparatus 11 of the present embodiment, when the downlink absolute delay time of the second wireless communication network 16 of the handover destination is shorter than the downlink absolute delay time of the first wireless communication network 15 of the handover source at handover from the first wireless communication network 15 to the second wireless communication network 16, the buffer size of the jitter buffer 47 is increased as necessary so as to accumulate the packets in the jitter buffer 47 without discarding the packets even if overtaking of the packets is occurred. Then, the reproduction speed of the application is controlled such that the application is reproduced at a speed higher than the normal reproduction speed after overtaking of the packets ends and at the normal reproduction speed after the number of packets in the jitter buffer 47 becomes equal to or less than the standard amount. Thereby, it is possible to achieve the real-time property suitable to each wireless communication network and improve the communication quality by preventing deterioration of quality of reproduced voice caused by packet loss and deterioration of the speech quality caused by deterioration of the real-time property.

It is to be understood that the present invention is not limited to the above embodiments but may be varied or altered in a multiple of manners. For example, the present invention is applicable not only to the wireless communication apparatus to execute the VoIP application but also to a wireless communication apparatus to execute an application of the real-time communication system for streaming of multimedia data such as images and music. In such a case, the telephone function unit is replaced with a multimedia function unit having a similar jitter buffer control function in an execution unit of the application.

The invention claimed is:

1. A wireless communication apparatus comprising:
   a wireless communication unit for executing wireless communication by connecting to a first wireless communication network and a second wireless communication network different from the first wireless communication network;
   an execution unit for executing an application for real-time communication via the wireless communication unit;
   a jitter buffer for absorbing jitter by temporarily accumulating packets of the application being executed by the execution unit received via the wireless communication unit;
   a communication quality obtain unit for obtaining communication quality of a wireless link in the first wireless communication network;
   a handover control unit for starting handover from the first wireless communication network to the second wireless communication network based on the communication quality obtained by the communication quality obtain unit; and
   a control unit for determining when a predetermined time has elapsed and thereafter controlling a reproduction speed of the application based on an accumulated packet amount in the jitter buffer when an average of a reception interval of packets of the application received via the wireless communication unit is less than a predetermined value, wherein the predetermined time is equal to a sum of a difference between delay times of the first and second wireless communication networks and a time to receive a few packets.

2. The wireless communication apparatus according to claim 1, wherein the control unit increases the reproduction speed of the application when the accumulated packet amount in the jitter buffer is equal to or over a threshold.

3. The wireless communication apparatus according to claim 2, wherein the control unit returns the reproduction speed of the application to a normal speed when the accumulated packet amount in the jitter buffer is lower than the threshold during reproduction of the application at a high speed.

4. The wireless communication apparatus according to claim 1, further comprising an adaptive jitter control unit for controlling a buffer size of the jitter buffer in accordance with a reception condition of packets of the application, wherein the adaptive jitter control unit stops control of the buffer size of the jitter buffer if the adaptive jitter control unit detects completion of handover by the handover control unit.

5. A wireless communication method, comprising:
executing wireless communication by connecting to a first wireless communication network and a second wireless communication network different from the first wireless communication network;
executing an application for real-time communication via a wireless communication unit;
absorbing jitter by temporarily accumulating packets of an application being executed, the packets being received via the wireless communication unit;
obtaining communication quality of a wireless link in the first wireless communication network;
starting handover from the first wireless communication network to the second wireless communication network based on the communication quality obtained; and
determining when a predetermined time has elapsed and thereafter controlling a reproduction speed of the application based on an accumulated packet amount when an average of a reception interval of packets of the application received via the wireless communication unit is less than a predetermined value, wherein the predetermined time is equal to a sum of a difference between delay times of the first and second wireless communication networks and a time to receive a few packets.

6. The wireless communication method of claim 5, wherein the controlling step comprises increasing the reproduction speed of the application when the accumulated packet amount is equal to or over a threshold.

7. The wireless communication method of claim 6, wherein the controlling step further comprises returning the reproduction speed of the application to a normal speed when the accumulated packet amount is lower than the threshold during reproduction of the application at a high speed.

8. The wireless communication method of claim 5, further comprising controlling a buffer size in accordance with a reception condition of packets of the application, wherein the controlling step further comprises stopping control of the buffer size if completion of the handover is detected.

* * * * *